(No Model.)

C. S. HIGGINS.
APPARATUS FOR TESTING TALLOW, &c.

No. 309,718. Patented Dec. 23, 1884.

WITNESSES
Wm A Lowe
H Bannister

INVENTOR
Chas. S. Higgins by
B. E. Valentine
atty.

UNITED STATES PATENT OFFICE.

CHARLES S. HIGGINS, OF BROOKLYN, NEW YORK.

APPARATUS FOR TESTING TALLOW, &c.

SPECIFICATION forming part of Letters Patent No. 309,718, dated December 23, 1884.

Application filed May 9, 1884. (No model.)

*To all whom it may concern:*

Be it known that I, CHARLES S. HIGGINS, of the city of Brooklyn, county of Kings, and State of New York, have invented a new and useful Improvement in Apparatus for Testing Tallow; and I do hereby declare that the following specification, taken in connection with the drawings annexed to and forming part of the same, furnishes a full and clear description thereof, sufficient to enable those skilled in the art to which it pertains to make and operate the same.

My invention relates to an apparatus for testing the purity of tallow and stock for soap-making and kindred purposes. Tallow and stock are frequently adulterated, diluted, and mixed with foreign substances to such an extent as to entail considerable loss upon the manufacturer who uses them, relying simply upon their external appearance. A package of inferior stock, if sold and delivered when at a low temperature, will often present the appearance of much superior goods, but when introduced in the process of manufacturing will make manifest its inferior qualities. A large amount of water can be incorporated in such stock and add materially to its bulk and weight without apparently diminishing its body, so long as the stock is kept at a low temperature. Oils and acids are also frequently found in the stock, which tend to depreciate its value. To test the purity and quality of this stock I have invented the following-described apparatus, of which a plan view is shown in drawings by Figure 1, and a cross-section at Fig. 2.

A represents the apparatus, which I construct in a cylindrical form, with an outer wall, $a$, and an inner wall, $b$, leaving an inclosed chamber, S, between the two, which is filled with sand or other slow conducting substance, the temperature of which will be raised gradually when heat is applied.

Figure 3:
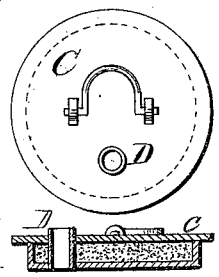

Fig. 3 is a plan view and cross-section of a cover, also constructed of two thicknesses of metal, between which a non-conducting substance is interposed.

D is an aperture with collar affixed, through which a brass tube, $t$, inclosing the stem and bulb of a thermometer, T, passes, being adapted to be held friction-tight by the collar D, as shown in the drawings.

G is a glass receptacle, which is placed upon a tripod, E, within the inner chamber, N, of the apparatus.

Figure 1:
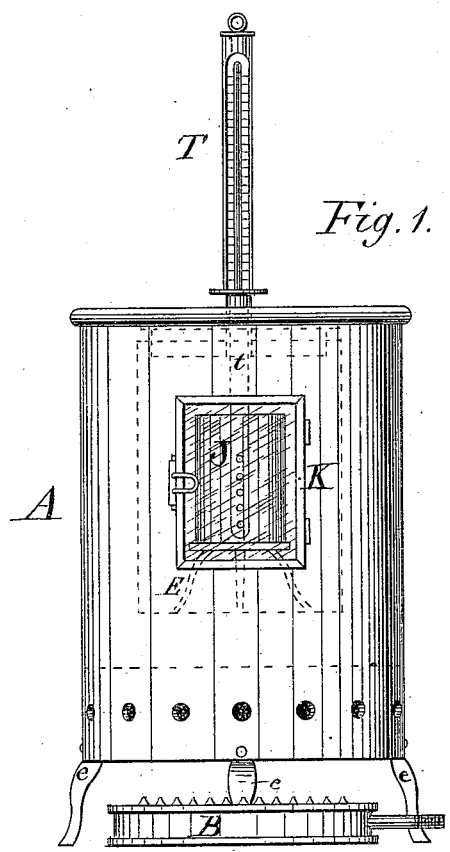
Figure 2:
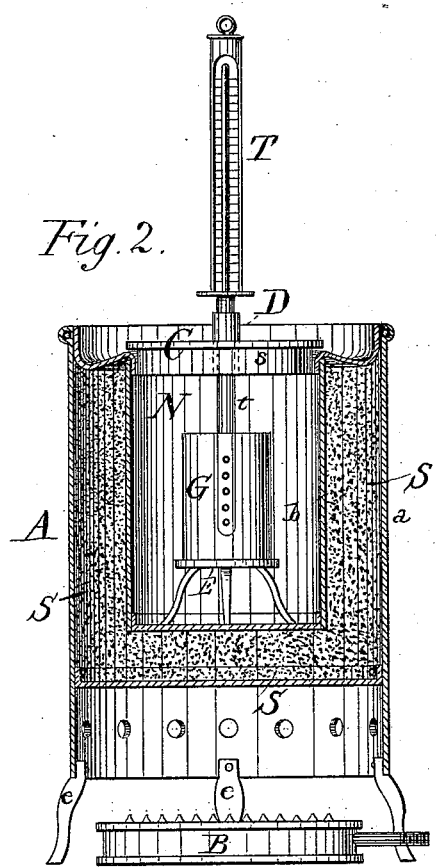

At K, Fig. 1, an opening is made through both the inner and outer walls, $a\ b$, by which the glass G can be inserted or removed. This aperture is provided by a door, J, having a panel of glass, through which the interior of the chamber and the glass G can be readily seen at all times.

B is a burner by which a gas-flame or other source of heat is introduced beneath the apparatus, which is raised sufficiently high by the legs $e$, and which burner may be connected with a gas-pipe by a flexible tube, so as to be readily inserted or removed from the apparatus without disturbing the position of the latter.

The method of using said apparatus in testing of stock is as follows: Having ascertained the melting-point of standard stock and noted the same upon the thermometer, the glass G is partly filled with the stock to be tested, and inserted in the chamber upon the tripod E through the door K, which is then tightly closed. The thermometer T is inserted with its tube through the collar D and projecting down into the stock which is in the glass G. The heat, being applied by the burner B, will raise the temperature of the chamber N and its contents very gradually, the mercury in the thermometer rising in keeping with the increase of temperature of the stock in the glass G. The strength of the body of the stock is determined by the point at which the mercury stands at the instant of the melting of the stock. In case the stock is diluted by water, the latter will evaporate while the temperature of the stock is rising, and the chamber being tightly closed, and preventing the escape of the moisture, will cause the water to be condensed upon the glass J of the door K, indicating its presence to the sight. Other impurities will become apparent to the observer through the glass door J by either settling or rising in the glass G as the stock melts, while the presence of acids is determined by hanging over the edge of the glass G, upon the inner side thereof, a thin strip of polished sheet-iron, which will be attacked by the acids, if any such injurious substances are present, and cause a discoloration, which will also be visible through the glass J of the door K.

The glass door performs the function in this apparatus of not only allowing the inspection of the contents, but by reason of its thinness, and consequent exposure to the outside atmosphere with no protecting-covering, it keeps cooler and affords a surface on which the vapor condenses.

This apparatus, though specially designed by me for use in testing soap-stock, can be used for many other purposes where it is desired to test the presence of adulterations or mixtures in articles which are capable of being melted at low temperature.

Having thus described my invention, I do not desire to be understood as claiming, broadly, a sand bath for melting by gradual heat; nor do I claim, broadly, the use of a thermometer in connection with a sand bath; but

What I claim as my invention, and desire to secure by Letters Patent, is—

1. In an apparatus for testing tallow, the combination of the vessel having double walls and a space between them filled with non-conducting material, and provided with an inspection-opening, and the double-walled cover, also filled with non-conducting material, with the glass receptacle for the tallow, placed inside the double-walled vessel, as set forth.

2. In an apparatus for melting oleaginous substances, the combination of the heating-chamber N and melting-receptacle G with the walls $a$ and $b$, having an opening, and glass door J set over said opening, serving to permit inspection of the interior, and to afford a surface on which the vapors may condense.

CHAS. S. HIGGINS.

Witnesses:
B. E. VALENTINE,
A. BANNISTER.